United States Patent [19]

Miller et al.

[11] 3,957,231
[45] May 18, 1976

[54] RESTRAINT SYSTEM

[76] Inventors: Michael Clayden Miller, 10 Moody Road, Hillhead, Fairham, Hants.; James Mitchell Hawkins, 45 Saint Albans Ave., Ashton-under-Lyne, Lancashire, both of England

[22] Filed: July 15, 1974

[21] Appl. No.: 488,669

[30] Foreign Application Priority Data
July 17, 1973  United Kingdom............... 33948/73

[52] U.S. Cl............................................ 244/122 AG
[51] Int. Cl.².......................................... B64D 25/02
[58] Field of Search ..... 244/122 R, 122 A, 122 AE, 244/122 AG, 122 B; 294/83 AA

[56] References Cited
UNITED STATES PATENTS

| | | | |
|---|---|---|---|
| 2,420,746 | 5/1947 | Heidman et al................ | 294/83 AA |
| 2,605,065 | 7/1952 | Wilkins .......................... | 244/122 B |
| 2,880,687 | 4/1959 | Kilverf........................... | 294/83 AA UX |
| 2,940,701 | 6/1960 | Beem et al..................... | 244/122 AG |
| 3,202,384 | 8/1965 | Martin ........................... | 244/122 AG |
| 3,329,464 | 7/1967 | Barwood et al................ | 244/122 B X |

*Primary Examiner*—Trygve M. Blix
*Assistant Examiner*—Galen L. Barefoot
*Attorney, Agent, or Firm*—Oblon, Fisher, Spivak, McClelland & Maier

[57] ABSTRACT

An arm restraint system comprises for each arm of the occupants a sleeve to which a tape is connected at two spaced points. A ring, slidable on this tape, is connected, through a disengageable barrel connector, to a second tape which runs through a snubber block and is connected to the vehicle via a shear pin. Ejection of the occupant pulls the second tape through the snubber block and through the barrel connector, the first tape across the occupant thus drawing the arm through the sleeve down to the occupant's side.

14 Claims, 3 Drawing Figures

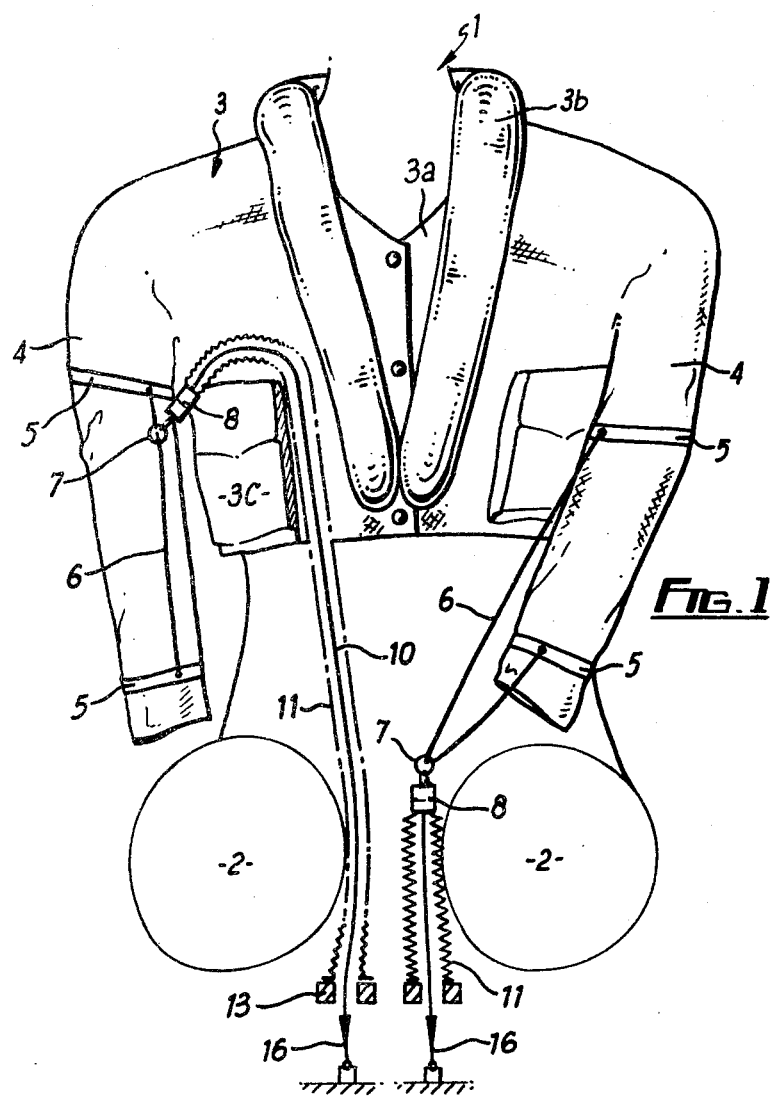
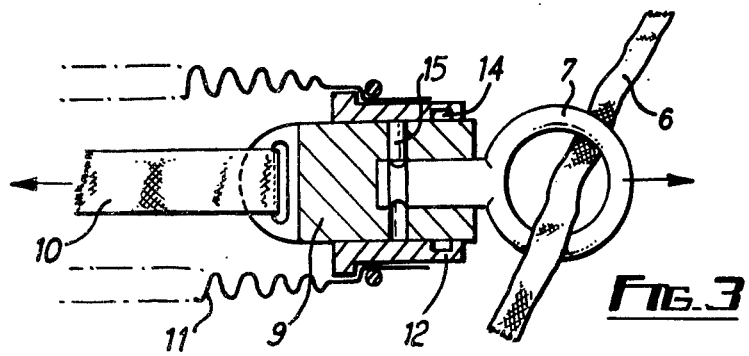

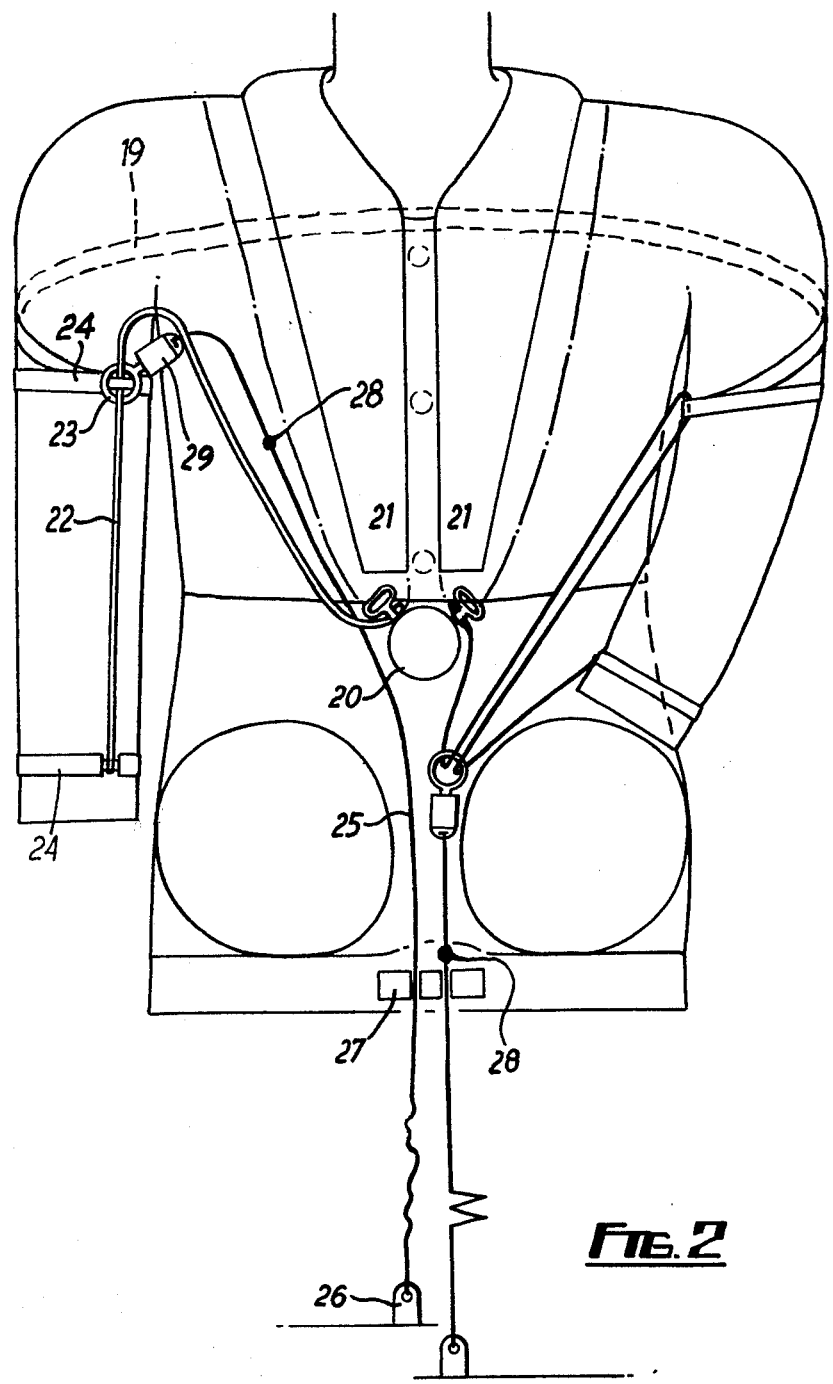

RESTRAINT SYSTEM

The present invention relates to an arm restraint system and particularly, but not exclusively, to such systems for use in emergency egress from aircraft. Systems of this nature have already been proposed in, for example, British Patent Specification number 996,635.

An airman ejecting from an aircraft which may be flying in excess of the speed of sound, is, on ejection, subject to a considerable pressure from the surrounding airstream. This is particularly dangerous if the airman's arms or legs should be caught in the airstream, since irrepairable physical limb damage can result. The danger is acute in the case of arms, since the airman may have an arm outstretched at the time of ejection and this arm will be subject to the full force of the airstream on ejection.

According to the present invention, there is provided an arm restraint system for use in an emergency escape operation in which an ejection seat and occupant may be ejected together comprising, for each of the occupants arms, a first elongate flexible member adapted to be connected at two spaced points to the corresponding arm, a slidable member adapted to slide along the flexible member and to connect that member to a second elongate flexible member adapted to be connected to the vehicle from which egress is to be made and friction means through which the second elongate flexible member extends adapted to be fixed to the seat itself, the arrangement being such that, in operation, movement of the seat relative to the vehicle causes movement of the second flexible member through the friction means and thus movement of the first flexible member to pull the corresponding arm into the body. The friction means advantageously comprises a snubber box, the latter being a device which in use will permit movement of the flexible member therethrough in one direction but not in the other.

It is often also required that the occupant can escape from the seat and the aircraft, for example, if the aircraft catches fire on the ground, with a minimum of distinct disconnecting actions. The situation is known as an "emergency egress" situation. One such disconnecting action is usually the operation of a quick release box which in use secures the occupant within his seat and parachute harnesses. To meet the additional requirement the first flexible member may extend to the quick release box.

In a preferred embodiment however, a connector releasably connects the slidable member to the second flexible member and a further flexible static line connects this connector to the seat or structure in such a way that tension upon the said further static line will open the connector and release the slidable member from the second flexible member. The further static line is preferably a sleeve surrounding the second flexible member and connected at one end to the connector and at the other to the seat.

In order that the present invention may be more clearly understood two embodiments of the invention will now be described by way of example with reference to the accompanying drawings in which:

FIG. 1 shows a diagrammatic front elevational view in partial section of a seated airman provided with one form of arm restraint system according to the present invention.

FIG. 2 shows a diagrammatic front elevation view in partial section of a seated airman provided with another form of arm restraint system according to the present invention, and FIG. 3 shows a barrel connector for the embodiment of FIG. 1.

Referring to FIG. 1 the airman 1 is shown in a seated position on an ejection seat with the legs 2 being shown in section. The airman wears a lifepreserver 3. The lifepreserver is of the type comprising a waistcoat 3a fitted with a floatation stole 3b extending around the neck line and down the front of the waistcoat and terminating above the waistline. The waistcoat has pockets 3c to carry survival aids.

The lifepreserver is provided with two net fabric sleeves 4 in order to incorporate the arm restraint system. If desired the sleeves 4 may be of woven or other suitable material. The arm restraint system basically comprises, for each arm, a pair of arm bands 5 contained in fabric tunnels respectively disposed at a wrist position and a position intermediate the elbow and shoulder and open towards the front of the sleeve, a tape 6 extending between and connected to the two arm bands, a ring part 7, through which the tape 6 extends and which forms the male part of a barrel connector 8 and a further tape 10 which is connected to a female part 9 of the connector 8 and which is housed in a fabric sleeve 11. The arm band 5 may be directly connected to the jacket sleeve, for example, by sewing. The sleeves 11 should be made from a low friction material and as thin as possible to allow easy concertinaing compatible with normal wear and tear. The diameter of the sleeve need be only sufficiently large to allow the inner tape to run through easily and the tube itself to concertina down easily. The sleeve 11 is also shorter in length than the tape 10 which it houses and is connected at its upper end to a metal sleeve 12 which forms part of the barrel connector. The other end of the sleeve 11 is connected to the top of a snubber block 13 which is fixed to the ejection seat itself. The lower end of the tape 10 after passing through the snubber block is connected to the floor of the aircraft cockpit through a shear rivet 16. The tape 6 is held close to the arm by touch and close fasteners extending along the sleeve and the barrel connector can be located on the sleeve with a touch and close patch.

The system must be capable of satisfying two criteria, it must quickly pull the arms of the airman to a safe position for protection from airblast caused by ejection and it must be capable of being rendered inoperative should it be necessary for an airman to carry out emergency egress procedure with the aircraft standing on the ground. The operation of the above described system under these two sets of conditions is as follows.

For the ejection condition, the airman will initiate the ejection procedure in the normal way as a result of which the seat will begin to rise off the cockpit floor. The tapes 10 travel through their respective snubber blocks while the sleeve 11 concertina. Each barrel connector remains connected since no tension is placed on the connector sleeve 12 by the fabric sleeve 11 but the tension applied through the tape 10 and the barrel connector to the tape 6 causes this tape to be pulled from the sleeve as a result of which the respective arm of the airman is quickly pulled at the wrist and upper arms points to the side of the body as shown on the right hand side of FIG. 1. The ring part 7 of the connector slides on the tape 6 to a point below the midpoint of the sleeve 4 so that in the operative arm restrained position the tape 6 to a point below the midpoint of the sleeve 4 so that in the operative arm restrained position the tape 6 is pulled into a V-shape as can be seen. The elbow is then held against the side of the body and the wrist is held against the thigh. This movement of the tapes 10 continues until stops 16 on the tapes prevent further movement of the tapes through the snubber blocks. Further movement of the seat then causes the shear rivets to shear to detach the tapes from the cockpit floor.

There is a condition known as Emergency Egress where the airman in an emergency has to leave the aircraft without using the ejector seat, e.g. on the ground with the aircraft on fire. During emergency egress when the airman stands up this action will subject the fabric sleeve 11 to tension which is transmitted to the sleeve 12 of the barrel connector 8 (see FIG. 3). This sleeve 12 carries on its internal surface a groove 14 which co-operates with projections 15 to enable the part 7 to be removed from the part 9. With the connectors disconnected the airman will be free to move his arms as he wishes.

Referring now to FIG. 2 which also shows an airman seated on an ejection seat, an alternative form is shown in which the quick release box 20 of the airman's harness is used as an anchorage point for the arm restraint tapes. The arm restraint tapes 22 are threaded through the two top insert attachments of the Quick Release Box. Each tape 22 is also threaded through a ring 23 and through two arm bands 24 again disposed at the wrist position and at a position intermediate the elbow and shoulder. To each ring is attached through a quick release connector 29 the seat tape 25 and at the end of the line a shear rivet 26 is attached to the floor of the aircraft cockpit. The tape 25 extends through a snubber block 27 allowing downward, but not upward movement of the tape 25 therethrough. In other respects the embodiment is the same as that of FIG. 1. This arrangement must also satisfy the two sets of conditions outlined above for the first embodiment and the operation of this arrangement under these two sets of conditions is as follows. When the airman begins the ejection procedure, the ejection seat moves up in relation to the cockpit and as before the tapes 25 are pulled through the snubber blocks 27. This in turn pulls the rings 23 and, through those rings, the tapes 22 to bring the arms quickly down to a safe rest position close to the airman's body as in the first embodiment. This position for one arm only is shown on the right-hand side of FIG. 1. Movement of the tapes 25 through the snubber blocks is eventually stopped by stops 28 on the tapes and further movement of the seat causes the shear rivets to shear disconnecting the tapes 25 from the floor. Should the airman require an emergency egress then the release of his quick release box 20 will also serve to free his arm restraint.

The advantages of this embodiment over the first is that during ejection as the tape 22 passes from the ring 23 to the arm three times the arm is drawn in proportionally faster than in the first embodiment where the tape 6 only passes twice. The disadvantages of the second embodiment as compared with the first, however, is that the airman needs to thread the tapes 22 through the brackets 21 when he first gets into the aircraft, during the strapping-in procedure.

In both embodiments, after the airman has left the aircraft with his ejection seat he will eventually separate from the seat. When this happens a guillotine forming part of the seat detaches the tapes (6, 25) from the seat.

It will be appreciated that the above described embodiments have been given by way of example only and that many variations will be possible without departing from the scope of the invention. For example in the first embodiment a simple separator guard could be fitted on top of each snubber block to ensure that the sleeve cannot enter the block as the seat is ejected. If desired a guide system could be provided for those parts of the tapes below the snubber blocks.

A tape 19 may be sewn to the life jacket passing between the upper arm bands 5 and around the back of the wearer to brace the wearers shoulder in operation. The stop 28 may be a ball bearing sewn into the tapes.

What is claimed is:

1. An arm restraint system for use in an emergency escape operation in which an ejection seat and occupant may be ejected together comprising, for each of the occupant arms, a first elongate flexible member adapted to be connected at two fixed points to the corresponding arm, said points being on opposite sides of the elbow joint, a slidable member adapted to slide along the flexible member between said two fixed points and to connect that member to a second elongate flexible member adapted to be connected to the vehicle from which egress is to be made and friction means through which the second elongate flexible member can move in one direction only adapted to be fixed to the seat itself, the arrangement being such that, in operation, movement of the seat relative to the vehicle causes movement of the second flexible member through the friction means and thus movement of the first flexible member to pull the corresponding arm through said two fixed points into the body.

2. An arm restraint system as claimed in claim 1, in which a barrel connector is provided which releasably connects the second flexible member to the slidable member and which comprises an outer sleeve having a groove formed in the internal face thereof, an inner member slidable within the sleeve, and projections normally housed within the member in which position they serve to secure the slidable member to the inner member, said projections being allowed, when they and the groove are aligned, to register in the groove and allow the slidable member and the inner member to be disconnected, the outer sleeve being connected to a fabric sleeve which is connected at its other end to the friction means and which surrounds the second elongate flexible member.

3. An arm restraint system as claimed in claim 2, in which the fabric sleeve is made from low friction material and is thin to facilitate concertinaing.

4. An arm restraint system as claimed in claim 3, in which a separator guard is attached to the friction means to prevent the fabric sleeve being pulled through the friction means.

5. An arm restraint system as claimed in claim 1, in which a stop is provided on the second elongate flexible member to limit its travel through the friction means.

6. An arm restraint system as claimed in claim 5, in which the stop is a bearing ball sewn into the flexible member.

7. An arm restraint system as claimed in claim 1, in which a further elongate flexible member extends between the uppermost points of the pairs of spaced points.

8. An arm restraint system as claimed in claim 1, in which the elongate flexible members are tapes.

9. A life preserver for use in an emergency escape operation in which an ejection seat and occupant may be ejected together comprising an arm restraint system including, for each of the occupants arms, a sleeve, two bands disposed around the sleeve at spaced points on opposite sides of the elbow joint, a first elongate flexible member connected to the two bands, a slidable member adapted to slide along the flexible member and to connect that member to a second elongate flexible member adapted to be connected to the vehicle from which egress is to be made and friction means through which the second elongate flexible member extends adapted to be fixed to the seat itself, the arrangement being such that, in operation, movement of the seat relative to the vehicle causes movement of the second flexible member through the friction means and thus movement of the first flexible member to pull the corresponding arm into the body.

10. A life preserver as claimed in claim 9, in which the sleeve is made from the net fabric.

11. A life preserver as claimed in claim 9, in which the sleeve is made from woven fabric.

12. A life preserver for use in arm emergency escape operation in which an ejection seat and occupant may be ejected together comprising an arm restraint system including a quick release box and, for each of the occupant arms, a sleeve, two bands disposed around the sleeve at spaced points on opposite sides of the elbow joint, a first elongate flexible member being attached at one of its ends to one of the bands, slidably connected to the other band and attached at its other end to the quick release box; a slidable member adapted to slide along the flexible member and to connect that member to a second elongate flexible member adapted to be connected to the vehicle from which egress is to be made and friction means through which the second elongate flexible member extends adapted to be fixed to the seat itself, the arrangement being such that, in operation, movement of the seat relative to the vehicle causes movement of the second flexible member through the friction means and thus movement of the first flexible member to pull the corresponding arm into the body.

13. A life preserver as claimed in claim 12, in which the sleeve is made from net fabric.

14. A life preserver as claimed in claim 12 in which the sleeve is made from woven fabric.

* * * * *